United States Patent
May et al.

(10) Patent No.: US 8,151,933 B2
(45) Date of Patent: Apr. 10, 2012

(54) THERMALLY AND ACOUSTICALLY INSULATIVE VEHICLE FLOORING

(75) Inventors: Philip G. May, Bloomington, IN (US); Donald L. Fishel, Dublin, OH (US)

(73) Assignee: CVG Management Corporation, New Albany, OH (US)

( * ) Notice: Subject to any disclaimer, the term of this patent is extended or adjusted under 35 U.S.C. 154(b) by 0 days.

(21) Appl. No.: 12/778,553

(22) Filed: May 12, 2010

(65) Prior Publication Data

US 2010/0288582 A1    Nov. 18, 2010

Related U.S. Application Data

(60) Provisional application No. 61/177,941, filed on May 13, 2009.

(51) Int. Cl.
*E04B 1/82* (2006.01)
(52) U.S. Cl. ........................... 181/286; 181/284
(58) Field of Classification Search .................. 181/286, 181/284
See application file for complete search history.

(56) References Cited

U.S. PATENT DOCUMENTS

| | | | | |
|---|---|---|---|---|
| 5,088,576 | A * | 2/1992 | Potthoff et al. | 181/290 |
| 5,744,763 | A * | 4/1998 | Iwasa et al. | 181/286 |
| 7,785,437 | B2 * | 8/2010 | Gilder et al. | 156/250 |
| 2004/0224166 | A1 | 11/2004 | Parrish et al. | |
| 2005/0064779 | A1 * | 3/2005 | Allison et al. | 442/181 |
| 2005/0150720 | A1 * | 7/2005 | Tudor et al. | 181/286 |
| 2006/0201741 | A1 * | 9/2006 | Inoue et al. | 181/204 |
| 2006/0289231 | A1 * | 12/2006 | Priebe et al. | 181/290 |
| 2007/0012512 | A1 * | 1/2007 | Fusiki et al. | 181/286 |
| 2007/0194592 | A1 * | 8/2007 | Lindsay et al. | 296/97.23 |
| 2008/0223654 | A1 * | 9/2008 | Juriga | 181/286 |
| 2009/0255755 | A1 * | 10/2009 | Matsuyama et al. | 181/290 |
| 2010/0285298 | A1 * | 11/2010 | Gilder et al. | 428/313.3 |

* cited by examiner

*Primary Examiner* — Forrest M Phillips
(74) *Attorney, Agent, or Firm* — Kegler Brown Hill & Ritter; James J. Pingor

(57) ABSTRACT

A vehicle flooring system with improved thermal and acoustic properties is provided that does not unreasonably increase the thickness and weight of the flooring system and does not break down due to repeated exposure to high temperatures and wide ranging temperature fluctuations. Various materials and construction methods are combined to provide a system with optimized thermal conductivity, having varied density ratios of materials to meet particular sound transmission loss profiles. These materials include a wide range of foam and other materials.

22 Claims, 2 Drawing Sheets

THERMALLY AND ACOUSTICALLY INSULATIVE VEHICLE FLOORING

CROSS-REFERENCE TO RELATED APPLICATIONS

This application claims the benefit of U.S. Provisional Patent Application Ser. No. 61/177,941; filed May 13, 2009, all of which is incorporated by reference as if completely written herein.

STATEMENT REGARDING FEDERALLY SPONSORED RESEARCH OR DEVELOPMENT

This invention was not made as part of a federally sponsored research or development project.

TECHNICAL FIELD

The present invention relates generally to the field of acoustical and thermal insulation and, more particularly, to a vehicle flooring system.

BACKGROUND OF THE INVENTION

Acoustical and thermal insulators and liners for application to vehicles are well known in the art. These insulators typically rely upon both sound absorption, i.e. the ability to absorb incident sound waves and transmission loss, and the ability to reflect incident sound waves, in order to provide sound attenuation. They also rely upon thermal shielding properties to prevent or reduce the transmission of heat from various heat sources (e.g. engine, transmission and exhaust system) to the passenger compartment of the vehicle.

Over the years a number of adhesives, adhesive webs and binding fibers have been specifically developed to secure the various layers of the laminates together; however, laminated flooring systems still have an inherent risk of delamination and failure. The potential is, in fact, significant mainly due to the harsh operating environment to which vehicle flooring systems are subjected. Many vehicle flooring systems are located near and/or are designed to shield high heat sources such as the engine, transmission and exhaust system. As a result, the vehicle flooring systems are often subjected to extremely high temperatures, which have a tendency to degrade the adhesives and binders over time.

Thus, a vehicle flooring system with improved thermal and acoustic properties is desired, provided that it does not unreasonably increase the thickness and weight of the flooring system and also does not break down due to repeated exposure to high temperatures and wide ranging temperature fluctuations.

SUMMARY OF THE INVENTION

In its most general configuration, the present invention advances the state of the art with a variety of new capabilities and overcomes many of the shortcomings of prior methods in new and novel ways. In its most general sense, the present invention overcomes the shortcomings and limitations of the prior art in any of a number of generally effective configurations.

The thermally and acoustically insulative vehicle flooring system includes a contact layer having a contact layer thickness and a contact layer density, and a substrate layer which is joined to the contact layer having a substrate layer thickness and a substrate layer density.

The vehicle flooring system recognizes a unique ratio of contact layer density to the substrate layer density to obtain preferred thermal and acoustic performance, while still ensuring that the vehicle flooring system is flexible enough to facilitate easy installation, and to not interfere with other equipment in the vehicle, as well as being particularly cost effective. The substrate layer may include a lightweight cellular engineering material. Such substrate may include a foam material. In a particular embodiment, the substrate layer includes a closed cell foam material, whereas in an alternative embodiment the substrate layer includes an open cell foam material. In yet another embodiment, the substrate layer is a flexible polyurethane foam.

A further embodiment of the substrate layer includes a plurality of foam pieces held together with a binder, or what is commonly referred to as bonded, or rebonded, foam. The appearance of such a substrate layer is a solid cellular agglomerate of bonded flexible foam pieces. Thus, the substrate layer may include virgin or prime polyurethane, rebonded polyurethane and combinations thereof. Rebonded polyurethane foam may be particularly preferred so as to permit the surface covering elements to incorporate a relatively high percentage of recycled material. The properties of the substrate layer can be varied over a wide range by careful selection of the types and grades of the base material, particle size and uniformity of the shredded foam pieces, density of the completed substrate layer, compression ratio, binder type, and quantity of the binder.

As will be appreciated, rebonded foam in general, and rebonded polyurethane foam in particular, is known in the art of isocyanate-based polymeric foams. Specifically, it is known to mix pieces of foam with a binder which serves to bond the pieces to one another. Rebonding technology has been used for a number of years to recycle polyurethane foams. In yet another embodiment, the substrate layer incorporates at least 10-100% recycled foam or rebonded foam containing at least about 10-100% recycled foam chips, chunks, pieces, grounds, particles, or the like and a binder, adhesive, or prepolymer (and one or more additives). In additional embodiments, a water based foam system may also be used. In certain other embodiments, a felt or non-woven cushion may be utilized in place of foam.

Regardless of the construction of the substrate layer, the embodiments are generally characterized as having a compression modulus such that a relatively soft feel is imparted to a person standing on the vehicle flooring system.

The contact layer may be bonded to the substrate layer with a water-based adhesive designed to withstand the temperatures, and temperature fluctuations, common in vehicle flooring systems. As discussed in detail below, thermal conductivity of the vehicle flooring system may be defined in combination with a desirable ratio of contact layer density to the substrate layer density, for preferred acoustic performance and comfort, i.e., softness under foot.

Numerous variations, modifications, alternatives, and alterations of the various preferred embodiments, processes, and methods may be used alone or in combination with one another as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

Figure 1:
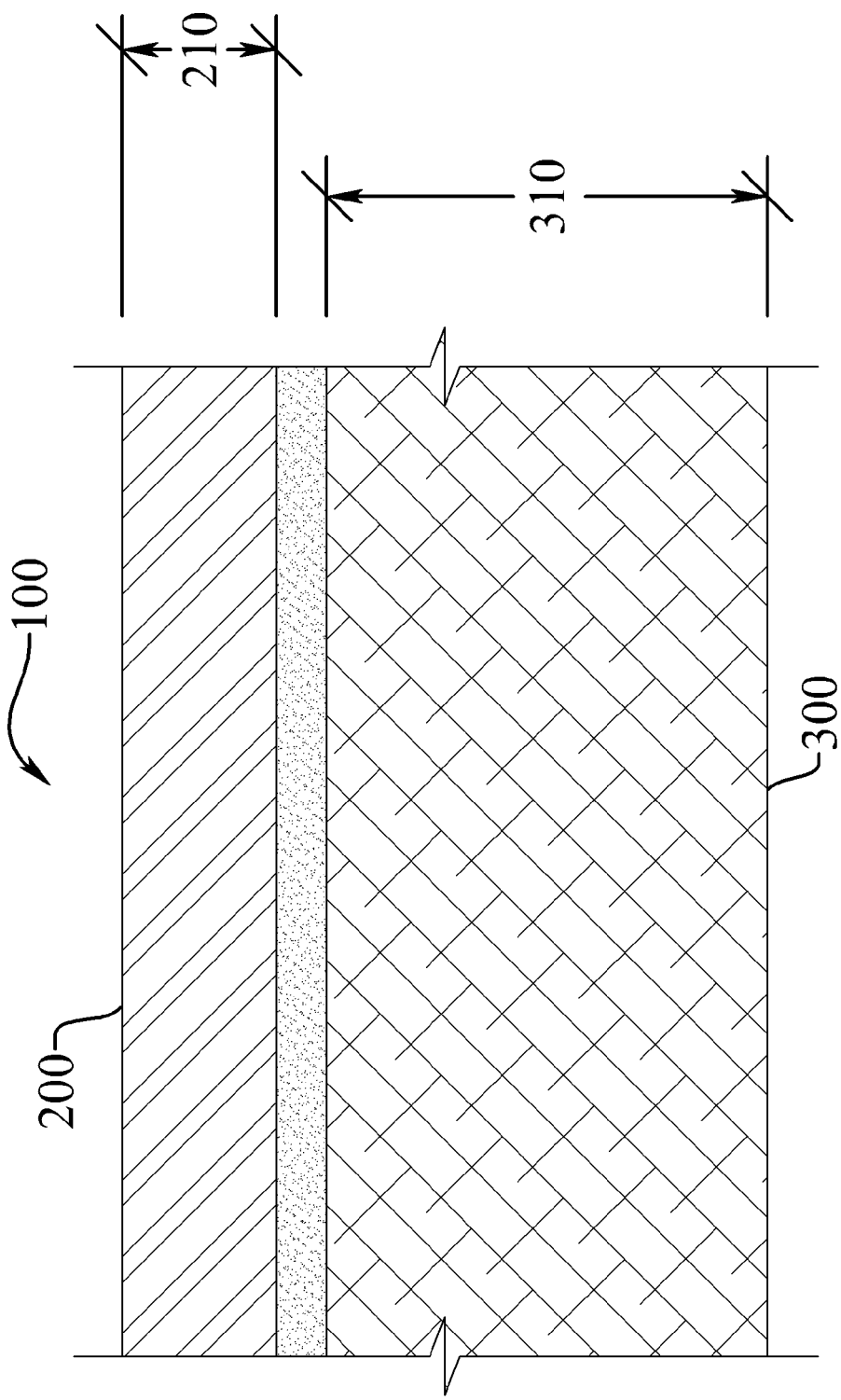
FIG. 1 shows a partial cross section of an embodiment of the vehicle floor system, not to scale.

These drawings are provided to assist in the understanding of the exemplary embodiments of the invention as described in more detail below and should not be construed as unduly limiting the invention. In particular, the relative spacing, positioning, sizing and dimensions of the various elements illustrated in the drawings are not drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

The present invention includes a thermally and acoustically insulative vehicle flooring system (100). The invention enables a significant advance in the state of the art. The preferred embodiments of the apparatus accomplish this by new and novel methods that are configured in unique and novel ways and which demonstrate previously unavailable but preferred and desirable capabilities. The description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Figure 2:
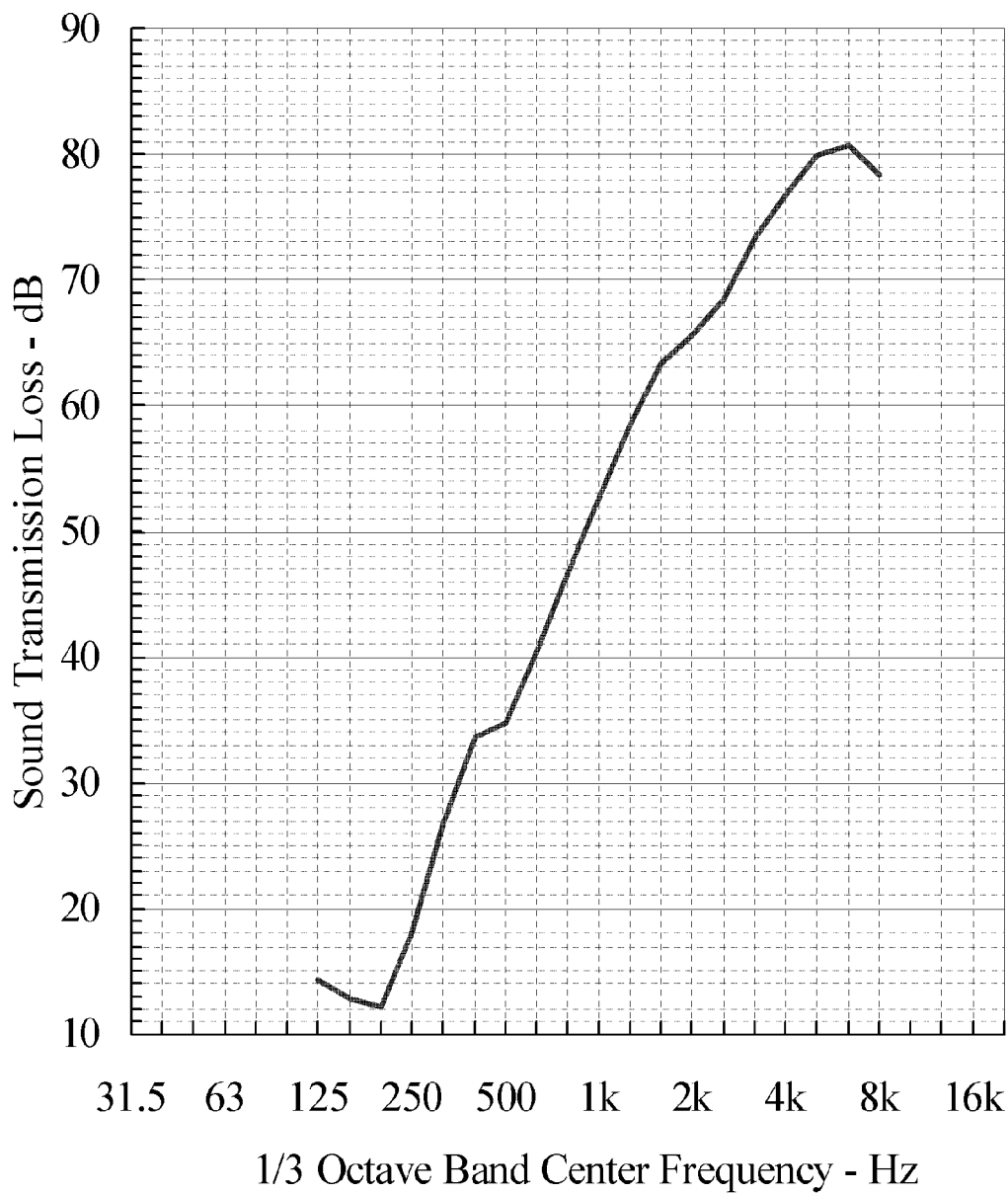
FIG. 2 shows a graph of the SAE J1400 sound transmission loss profile for an embodiment of the vehicle flooring system.

As seen in FIG. 1, the thermally and acoustically insulative vehicle flooring system (100) includes a contact layer (200) and a substrate layer (300), joined together. The contact layer (200) has a contact layer thickness (210) and a contact layer density. Similarly, the substrate layer (300), which is joined to the contact layer (200), has a substrate layer thickness (310) and a substrate layer density. In one embodiment, the vehicle flooring system (100) may have a thermal conductivity, k-value, of less than 0.045 Watts per meter Kelvin (W/(m*K)), while also having a ratio of the contact layer density to the substrate layer density that is less than 40, thereby providing a desirable sound transmission loss profile, while maintaining workability of the vehicle flooring system (100). In fact, in one embodiment, the vehicle flooring system (100) has an SAE J1400 sound transmission loss profile with a sound transmission loss of at least 14 dB at 125 Hz, at least 18 dB at 250 Hz, at least 75 dB at 4000 Hz, and 78 dB at 6300 Hz. FIG. 2 illustrates the SAE J1400 sound transmission loss profile of one particular embodiment of the vehicle flooring system (100), having the horizontal axis showing the ⅓ octave band center frequencies and the vertical axis showing the associated sound transmission loss in dB.

As one skilled in the art will appreciate, the thermal conductivity is the quantity of heat transmitted through a unit thickness in a direction normal to a surface of unit area, due to a unit temperature gradient under steady state conditions. Further, the referenced SAE J1400 sound transmission loss profile is a reference to a profile measured in accordance with the industry standard SAE J1400 "Laboratory Measurement of the Airborne Sound Barrier Performance of Automotive Materials and Assemblies," produced by SAE International, May 1990. The SAE J1400 standard includes a test procedure for determining the airborne sound barrier performance of materials and composite assemblies commonly installed in surface vehicles and marine products. This method facilitates the evaluation of automotive materials and assemblies under conditions of representative size, edge constraint, and sound incidence so as to allow better correlation with in-use barrier performance.

The vehicle flooring system (100) recognizes the unique ratio of contact layer density to the substrate layer density to obtain the previously described preferred thermal and acoustic performance, while still ensuring that the vehicle flooring system (100) is flexible enough to facilitate easy installation, while not interfering with other equipment in the vehicle, as well as being particularly cost effective. The substrate layer (300) includes a lightweight cellular engineering material. In one embodiment, the substrate layer (300) has a density of at least 3.5 pounds per cubic foot and includes a foam material. In a particular embodiment, the substrate layer (300) includes a closed cell foam material, whereas in an alternative embodiment the substrate layer (300) includes an open cell foam material. In yet another embodiment, the substrate layer (300) is a flexible polyurethane foam.

A further embodiment of the substrate layer (300) includes a plurality of foam pieces held together with a binder, or what is commonly referred to as bonded, or rebonded, foam. The appearance of such a substrate layer (300) is a solid cellular agglomerate of bonded flexible foam pieces. Thus, the substrate layer (300) may include virgin or prime polyurethane, rebonded polyurethane and combinations thereof. Rebonded polyurethane foam may be particularly preferred so as to permit the surface covering elements to incorporate a relatively high percentage of recycled material. The properties of the substrate layer (300) can be varied over a wide range by careful selection of the types and grades of the base material, particle size and uniformity of the shredded foam pieces, density of the completed substrate layer (300), compression ratio, binder type, and quantity of the binder.

As will be appreciated, rebonded foam in general, and rebonded polyurethane foam in particular, is known in the art of isocyanate-based polymeric foams. Specifically, it is known to mix pieces of foam with a binder which serves to bond the pieces to one another. Rebonding technology has been used for a number of years to recycle polyurethane foams. In yet another embodiment, the substrate layer (300) incorporates at least 10-100% recycled foam or rebonded foam containing at least about 10-100% recycled foam chips, chunks, pieces, grounds, particles, or the like and a binder, adhesive, or prepolymer (and one or more additives).

Although the above examples have to do with polyurethane, a water based foam system can also be used. For example, the foam may be a Styrene Butadiene Rubber (SBR) foam. Although a virgin polyurethane or polyurethane rebonded foam or compressed particle foam (formed of compressible particles, chips, crumbs, etc.) may be preferred, it is to be understood that other compressible particles made from other foams (open cell, closed cell) or materials such as SBR foam, PVC foam, polyethylene foam, cork, rubber, crumb rubber, and/or the like may also be used. In particular, it is contemplated that in place of foam, a felt or non-woven cushion may be utilized.

Regardless of the construction of the substrate layer (300), it will preferably be characterized by a compression modulus such that a relatively soft feel is imparted to a person standing on the vehicle flooring system (100). By way of example only, in one particular example it is contemplated that the cushioning material will preferably be characterized by a 50% compression at a load of between about 5 psi to about 70 psi, and more preferably about 10 psi to about 30 psi, when the isolated cushioning material is measured according to ASTM specification D3574 Test C (Compression Force Deflection Test).

The contact layer (200) may be bonded to the substrate layer (300) with a water-based adhesive designed to withstand the temperatures, and temperature fluctuations, common in vehicle flooring systems (100). In one embodiment, the contact layer (200) may be a solid polymer having a contact layer thickness (210) of 0.1 to 0.15 inches, yielding a surface density of the contact layer (200) of 1.0 to 1.5 pounds per square foot. In other embodiments, the contact layer (200) may be a solid polymer having a contact layer thickness (210) of 0.08 to 0.17 inches, yielding a surface density of the contact layer (200) of 0.8 to 1.5 pounds per square foot. In a further embodiment, the solid polymer contact layer is PVC. In one particular embodiment incorporating a PVC contact layer (200), having a 0.1 inch contact layer thickness (210) and a contact layer density of 120 pounds per cubic foot, bonded to a rebonded foam substrate layer (300), having a 0.75 inch substrate layer thickness (310) and a substrate layer density of 3.7 pounds per cubic foot, the acoustic and thermal insulating properties were further improved such that the thermal conductivity of the vehicle flooring system (100) is less than 0.0410 Watts per meter Kelvin (W/(m*K)). At the same time, a desirable ratio of the contact layer density to the substrate layer density is maintained for preferred acoustic performance and comfort, i.e., softness under foot. In fact, in this embodiment the density ratio is less than 32.5. The improved acoustic performance of this embodiment was demonstrated via a SAE J1400 sound transmission loss profile for the vehicle flooring system (100) that further includes a sound transmission loss of at least 34 dB at 500 Hz, at least 52.5 dB at 1000 Hz, at least 78 dB at 4000 Hz, and 80 dB at 6300 Hz.

One skilled in the art will realize that the above teaching concerns only one set of possible inventive parameters, and that many other performance specifications and materials may be desired in an embodiment or series of embodiments.

For example, in some embodiments, seen in FIG. 1, a thermally and acoustically insulative vehicle flooring system (100) may include a contact layer (200) having a contact layer thickness (210) and a contact layer density, and a substrate layer (300) joined to the contact layer (200), where the substrate layer (300) includes a lightweight cellular engineering material and has a substrate layer thickness (310) and a substrate layer density.

The performance specifications of such an embodiment may include embodiments where the thermal conductivity of the vehicle flooring system (100) is less than 0.0500 Watts per meter Kelvin (W/(m*K)). Additionally, a ratio of the contact layer density to the substrate layer density may be less than 45. Furthermore, an SAE J1400 sound transmission loss profile for the vehicle flooring system (100) may include a sound transmission loss of at least 12 dB at 125 Hz, at least 14 dB at 250 Hz, at least 70 dB at 4000 Hz, and 72 dB at 6300 Hz.

In certain embodiments, the thermally and acoustically insulative vehicle flooring system (100) may include embodiments wherein the substrate layer (300) includes at least one foam; and in certain embodiments, the at least one foam may be a closed cell foam. In yet other embodiments, the at least one foam may be an open cell foam. In certain embodiments, the substrate layer (300) may be rebonded foam having a density of at least 3.2 pounds per cubic foot; and in certain embodiments that are not necessarily co-extensive with the specifications above, the rebonded foam may be a polyurethane foam.

In some embodiments, the contact layer (200) may be a solid polymer. In other embodiments, the contact layer (200) may include a polymer selected from the group of polymers consisting of rubber, synthetic rubber, thermoplastic polyolefin (TPO), and urethane. In certain embodiments, the contact layer (200) density may be at least 100 pounds per cubic foot.

One skilled in the art will recognize that the above materials are described for purposes of example only, and not as limitations, and that one skilled in the art will be able to envision other materials and combinations which are suitable for particular uses.

In certain embodiments, the thermal conductivity of the vehicle flooring system (100) may be less than 0.0480 Watts per meter Kelvin (W/(m*K)), and in other and not necessarily co-extensive embodiments, the ratio of the contact layer density to the substrate layer density may be less than 45.

In yet other embodiments, a SAE J1400 sound transmission loss profile for the vehicle flooring system (100) may include a sound transmission loss of at least 31 dB at 500 Hz, at least 50 dB at 1000 Hz, at least 70 dB at 4000 Hz, and 72 dB at 6300 Hz.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative manufacturing processes and materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

We claim:

1. A thermally and acoustically insulative vehicle flooring system (100) comprising:
    a) a contact layer (200) having a contact layer thickness (210) and a contact layer density;
    b) a substrate layer (300) joined to the contact layer (200), wherein the substrate layer (300) includes a lightweight cellular engineering material and has a substrate layer thickness (310) and a substrate layer density; wherein the substrate layer (300) is rebonded foam; wherein
        (i) the thermal conductivity of the vehicle flooring system (100) is less than 0.0450 Watts per meter Kelvin (W/(m*K));
        (ii) a ratio of the contact layer density to the substrate layer density is less than 40; and
        (iii) an SAE J1400 sound transmission loss profile for the vehicle flooring system (100) includes a sound transmission loss of at least 14 dB at 125 Hz, at least 18 dB at 250 Hz, at least 75 dB at 4000 Hz, and 78 dB at 6300 Hz.

2. The thermally and acoustically insulative vehicle flooring system (100) of claim 1, wherein the substrate layer (300) includes at least one foam.

3. The thermally and acoustically insulative vehicle flooring system (100) of claim 2, wherein the at least one foam is a closed cell foam.

4. The thermally and acoustically insulative vehicle flooring system (100) of claim 2, wherein the at least one foam is an open cell foam.

5. The thermally and acoustically insulative vehicle flooring system (100) of claim 1, wherein the rebonded foam having a density of at least 3.5 pounds per cubic foot.

6. The thermally and acoustically insulative vehicle flooring system (100) of claim 5, wherein the rebonded foam is polyurethane foam.

7. The thermally and acoustically insulative vehicle flooring system (100) of claim 1, wherein the contact layer (200) is a solid polymer.

8. The thermally and acoustically insulative vehicle flooring system (100) of claim 7, wherein the contact layer (200) is PVC and the contact layer density is at least 100 pounds per cubic foot.

9. The thermally and acoustically insulative vehicle flooring system (100) of claim 1, wherein the thermal conductivity of the vehicle flooring system (100) is less than 0.0410 Watts per meter Kelvin (W/(m*K)).

10. The thermally and acoustically insulative vehicle flooring system (100) of claim 1, wherein the ratio of the contact layer density to the substrate layer density is less than 32.5.

11. The thermally and acoustically insulative vehicle flooring system (100) of claim 1, wherein the SAE J1400 sound transmission loss profile for the vehicle flooring system (100) includes a sound transmission loss of at least 34 dB at 500 Hz, at least 52.5 dB at 1000 Hz, at least 78 dB at 4000 Hz, and 80 dB at 6300 Hz.

12. A thermally and acoustically insulative vehicle flooring system (100) comprising:
   a) a contact layer (200) having a contact layer thickness (210) and a contact layer density, wherein the contact layer (200) is a solid polymer;
   b) a substrate layer (300) joined to the contact layer (200), wherein the substrate layer (300) includes a lightweight cellular engineering material and has a substrate layer thickness (310) and a substrate layer density; wherein
      (i) the thermal conductivity of the vehicle flooring system (100) is less than 0.0500 Watts per meter Kelvin (W/(m*K));
      (ii) a ratio of the contact layer density to the substrate layer density is less than 45; and
      (iii) an SAE J1400 sound transmission loss profile for the vehicle flooring system (100) includes a sound transmission loss of at least 12 dB at 125 Hz, at least 14 dB at 250 Hz, at least 70 dB at 4000 Hz, and 72 dB at 6300 Hz.

13. The thermally and acoustically insulative vehicle flooring system (100) of claim 12, wherein the substrate layer (300) includes at least one foam.

14. The thermally and acoustically insulative vehicle flooring system (100) of claim 13, wherein the at least one foam is a closed cell foam.

15. The thermally and acoustically insulative vehicle flooring system (100) of claim 13, wherein the at least one foam is an open cell foam.

16. The thermally and acoustically insulative vehicle flooring system (100) of claim 12, wherein the substrate layer (300) is rebonded foam having a density of at least 3.2 pounds per cubic foot.

17. The thermally and acoustically insulative vehicle flooring system (100) of claim 16, wherein the rebonded foam is polyurethane foam.

18. The thermally and acoustically insulative vehicle flooring system (100) of claim 12, wherein the contact layer (200) includes a polymer selected from the group of polymers consisting of rubber, synthetic rubber, thermoplastic polyolefin (TPO), and urethane; and the contact layer (200) density is at least 100 pounds per cubic foot.

19. The thermally and acoustically insulative vehicle flooring system (100) of claim 12, wherein the thermal conductivity of the vehicle flooring system (100) is less than 0.0480 Watts per meter Kelvin (W/(m*K)).

20. The thermally and acoustically insulative vehicle flooring system (100) of claim 12, wherein the ratio of the contact layer density to the substrate layer density is less than 40.

21. The thermally and acoustically insulative vehicle flooring system (100) of claim 12, 5 wherein the SAE J1400 sound transmission loss profile for the vehicle flooring system (100) includes a sound transmission loss of at least 31 dB at 500 Hz, at least 50 dB at 1000 Hz, at least 70 dB at 4000 Hz, and 72 dB at 6300 Hz.

22. A thermally and acoustically insulative vehicle flooring system (100) comprising:
   a) a contact layer (200) comprising a polymer selected from the group of polymers consisting of rubber, synthetic rubber, thermoplastic polyolefin (TPO), and urethane, wherein the contact layer (200) has a contact layer thickness (210) and a contact layer density;
   b) a substrate layer (300) joined to the contact layer (200), the substrate layer (300) comprising a lightweight cellular engineering material and a rebonded foam having a density of at least 3.2 pounds per cubic foot, wherein the substrate layer (300) has a substrate layer thickness (310) and a substrate layer density; wherein
      (i) the thermal conductivity of the vehicle flooring system (100) is less than 0.0500 Watts per meter Kelvin (W/(m*K));
      (ii) a ratio of the contact layer density to the substrate layer density is less than 45; and
      (iii) an SAE J1400 sound transmission loss profile for the vehicle flooring system (100) includes a sound transmission loss of at least 12 dB at 125 Hz, at least 14 dB at 250 Hz, at least 70 dB at 4000 Hz, and 72 dB at 6300 Hz.

* * * * *